(12) United States Patent
Stolbikov et al.

(10) Patent No.: US 12,282,562 B2
(45) Date of Patent: Apr. 22, 2025

(54) PREDICTING SYSTEM MISCONFIGURATIONS USING MACHINE LEARNING

(71) Applicant: Lenovo (Singapore) Pte. Ltd., New Tech Park (SG)

(72) Inventors: Igor Stolbikov, Apex, NC (US); Jixin Feng, Cary, NC (US); Scott Li, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 390 days.

(21) Appl. No.: 17/576,834

(22) Filed: Jan. 14, 2022

(65) Prior Publication Data

US 2023/0229781 A1 Jul. 20, 2023

(51) Int. Cl.
*G06F 21/57* (2013.01)
*G06N 20/00* (2019.01)

(52) U.S. Cl.
CPC ........... *G06F 21/577* (2013.01); *G06N 20/00* (2019.01); *G06F 2221/034* (2013.01)

(58) Field of Classification Search
None
See application file for complete search history.

(56) References Cited

U.S. PATENT DOCUMENTS 11,238,162 B1 * 2/2022 Shih .................. G06F 16/22
2020/0401696 A1 * 12/2020 Ringlein ............ G06F 21/552

FOREIGN PATENT DOCUMENTS

WO WO-2021114613 A1 * 6/2021 .......... G06F 11/3006

OTHER PUBLICATIONS

Jiaqi Yan, "Classifying Malware Represented as Control Flow Graphs using Deep Graph Convolutional Neural Network", 2019, IEEE Computer Society (Year: 2019).*
Muhan Zhang, et al., "An End-to-End Deep Learning Architecture for Graph Classification", Association for the Advancement of Artificial Intelligence (AAAI-18), 2018, pp. 4438-4445.

(Continued)

*Primary Examiner* — Ario Etienne
*Assistant Examiner* — Mohammad Yousuf A. Mian
(74) *Attorney, Agent, or Firm* — Kunzler Bean & Adamson

(57) ABSTRACT

Methods, apparatus, and program products that can predict misconfigurations in a computing system using machine learning are disclosed herein. One method includes labeling one or more graph nodes or link nodes of a data graph of a computing system that includes one or more security vulnerabilities with a node label or link label, respectively, in which each node label represents the first security vulnerabilities associated with a particular graph node and each link label represents the second security vulnerabilities associated with a particular link node. The method further includes utilizing the graph node(s) or the link node(s) to train a machine learning algorithm to predict one or more misconfigurations in the computing system based on the security vulnerabilities and determining one or more modifications to the computing system for mitigating the one or more misconfigurations. Apparatus and program products that include and/or perform the methods are also disclosed herein.

20 Claims, 11 Drawing Sheets

(56) References Cited

OTHER PUBLICATIONS

Wikipedia, "Multi-label classification", Wikipedia, https://en.wikipedia.org/wiki/Multi-label_classification, Oct. 1, 2022, pp. 1-7.

Stellar Graph Demos, "Supervised graph classification with Deep Graph CNN", StellerGraph, https://stellargraph.readthedocs.io/en/stable/demos/graph-classification/dgcnn-graph-classification.html, known about as early as Nov. 2021, downloaded on Apr. 25, 2022, pp. 1-12.

* cited by examiner

PREDICTING SYSTEM MISCONFIGURATIONS USING MACHINE LEARNING

FIELD

The subject matter disclosed herein relates to computing systems and, more particularly, relates to using machine learning to predict misconfigurations in a computing system.

BACKGROUND

Security misconfigurations and/or cloud deployment that are non-compliant with industry security best practices are one of the major reasons for a compromised computing system and/or the inclusion of one or more security vulnerabilities in a computing system. In response thereto, traditional threat modeling began being a critical requirement for the security design and development practices of a computing system. Typically, conventional processes for security design and development practices of a computing system can be time consuming and/or error prone.

BRIEF SUMMARY

Apparatus, methods, systems, and program products that can predict misconfigurations in a computing system using machine learning are disclosed herein. An apparatus, in one embodiment, includes a processor and a memory that stores code executable by the processor. In certain embodiments, the code is executable by the processor to label one or more graph nodes of a data graph of a computing system that includes one or more first security vulnerabilities with a node label or label one or more graph communication links between graph nodes of the data graph of the computing system that includes one or more second security vulnerabilities with a link label, in which each node label represents the one or more first security vulnerabilities associated with a particular graph node and each link label represents the one or more second security vulnerabilities associated with a particular link node. The executable code further causes the processor to utilize one or more graph nodes or one or more link nodes of the data graph to train a machine learning algorithm to predict one or more misconfigurations in the computing system based on the one or more first security vulnerabilities included in each node label for the one or more graph nodes or the one or more second security vulnerabilities included in each link label for the one or more link nodes and determine one or more modifications to the computing system for mitigating the one or more misconfigurations predicted by the machine learning algorithm.

One embodiment of a method that can predict misconfigurations in a computing system using machine learning includes performing, by a processor, labeling one or more graph nodes of a data graph of a computing system that includes one or more first security vulnerabilities with a node label or labeling one or more graph communication links between graph nodes of the data graph of the computing system that includes one or more second security vulnerabilities with a link label, in which each node label represents the one or more first security vulnerabilities associated with a particular graph node and each link label represents the one or more second security vulnerabilities associated with a particular link node. The method further includes utilizing one or more graph nodes or one or more link nodes of the data graph to train a machine learning algorithm to predict one or more misconfigurations in the computing system based on the one or more first security vulnerabilities included in each node label for the one or more graph nodes or the one or more second security vulnerabilities included in each link label for the one or more link nodes and determining one or more modifications to the computing system for mitigating the one or more misconfigurations predicted by the machine learning algorithm.

A computer program product, in one embodiment, includes a computer-readable storage medium including program instructions embodied therewith. In certain embodiments, the program instructions are executable by a processor to cause the processor to label one or more graph nodes of a data graph of a computing system that includes one or more first security vulnerabilities with a node label or label one or more graph communication links between graph nodes of the data graph of the computing system that includes one or more second security vulnerabilities with a link label, in which each node label represents the one or more first security vulnerabilities associated with a particular graph node and each link label represents the one or more second security vulnerabilities associated with a particular link node. The executable code further causes the processor to utilize one or more graph nodes or one or more link nodes of the data graph to train a machine learning algorithm to predict one or more misconfigurations in the computing system based on the one or more first security vulnerabilities included in each node label for the one or more graph nodes or the one or more second security vulnerabilities included in each link label for the one or more link nodes and determine one or more modifications to the computing system for mitigating the one or more misconfigurations predicted by the machine learning algorithm.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
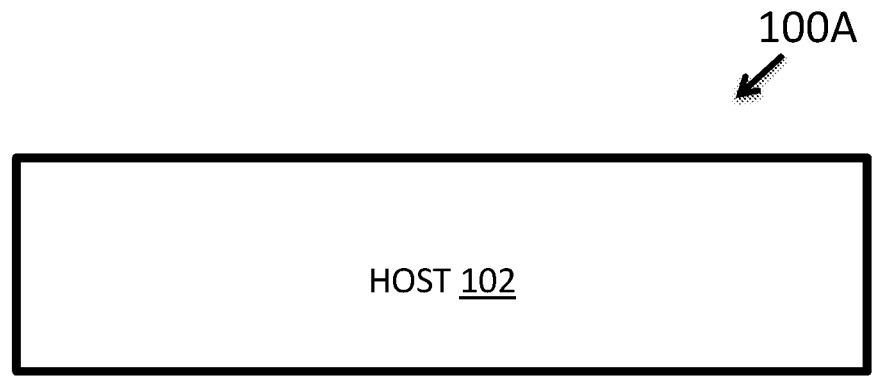
FIGS. 1A through 1C are schematic block diagrams illustrating various embodiments of a system that can predict misconfigurations in a computing system using machine learning.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include a computer-readable storage medium or a plurality of computer-readable storage media. A computer-readable storage medium may include a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The various embodiments disclosed herein provide apparatus, methods, and computer program products that can predict misconfigurations in a computing system using machine learning are disclosed herein. An apparatus, in one embodiment, includes a processor and a memory that stores code executable by the processor. In certain embodiments, the code is executable by the processor to label one or more graph nodes of a data graph of a computing system that includes one or more first security vulnerabilities with a node label or label one or more graph communication links between graph nodes of the data graph of the computing system that includes one or more second security vulnerabilities with a link label, in which each node label represents the one or more first security vulnerabilities associated with a particular graph node and each link label represents the one or more second security vulnerabilities associated with a particular link node. The executable code further causes the processor to utilize one or more graph nodes or one or more link nodes of the data graph to train a machine learning algorithm to predict one or more misconfigurations in the computing system based on the one or more first security vulnerabilities included in each node label for the one or more graph nodes or the one or more second security vulnerabilities included in each link label for the one or more link nodes and determine one or more modifications to the computing system for mitigating the one or more misconfigurations predicted by the machine learning algorithm.

One embodiment of a method that can predict misconfigurations in a computing system using machine learning includes performing, by a processor, labeling one or more graph nodes of a data graph of a computing system that includes one or more first security vulnerabilities with a node label or labeling one or more graph communication links between graph nodes of the data graph of the computing system that includes one or more second security vulnerabilities with a link label, in which each node label represents the one or more first security vulnerabilities associated with a particular graph node and each link label represents the one or more second security vulnerabilities associated with a particular link node. The method further includes utilizing one or more graph nodes or one or more link nodes of the data graph to train a machine learning algorithm to predict one or more misconfigurations in the computing system based on the one or more first security vulnerabilities included in each node label for the one or more graph nodes or the one or more second security vulnerabilities included in each link label for the one or more link nodes and determining one or more modifications to the computing system for mitigating the one or more misconfigurations predicted by the machine learning algorithm.

A computer program product, in one embodiment, includes a computer-readable storage medium including program instructions embodied therewith. In certain embodiments, the program instructions are executable by a processor to cause the processor to label one or more graph nodes of a data graph of a computing system that includes one or more first security vulnerabilities with a node label or label one or more graph communication links between graph nodes of the data graph of the computing system that includes one or more second security vulnerabilities with a link label, in which each node label represents the one or more first security vulnerabilities associated with a particular graph node and each link label represents the one or more second security vulnerabilities associated with a particular link node. The executable code further causes the processor to utilize one or more graph nodes or one or more link nodes of the data graph to train a machine learning algorithm to predict one or more misconfigurations in the computing system based on the one or more first security vulnerabilities included in each node label for the one or more graph nodes or the one or more second security vulnerabilities included in each link label for the one or more link nodes and determine one or more modifications to the computing system for mitigating the one or more misconfigurations predicted by the machine learning algorithm.

Figure 1B:
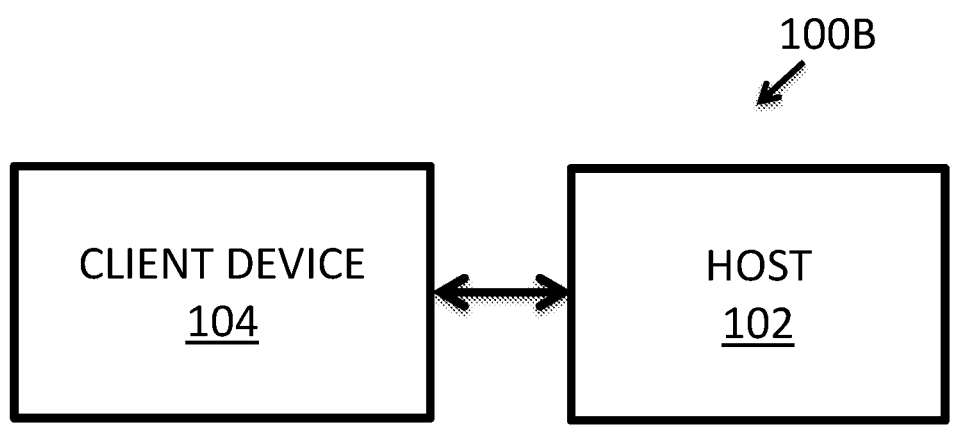
Figure 1C:
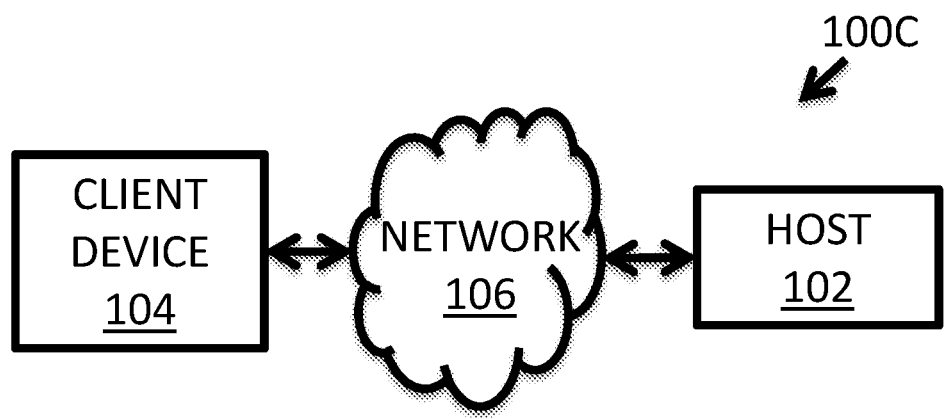

Turning now to the drawings, FIGS. 1A, 1B, and 1C are schematic block diagrams illustrating various embodiments of systems 100A, 100B, and 100C, respectively, that can predict misconfigurations in a computing system using machine learning. At least in the illustrated embodiment, a system 100A includes, among other components, a host computing device 102 (or host 102). A system 100B includes, among other components, a host 102 coupled to and/or in communication with a client device 104. In addition, a system 100C includes, among other components, a host 102 coupled to and/or in communication with a client device 104 via a network 106.

A host 102 may include any suitable electronic system, set of electronic devices, software, and/or set of applications capable of performing the operations and/or functions disclosed herein. In various embodiments, the host 102 is configured to utilize machine learning to predict misconfigurations in a computing system under test.

Figure 2A:
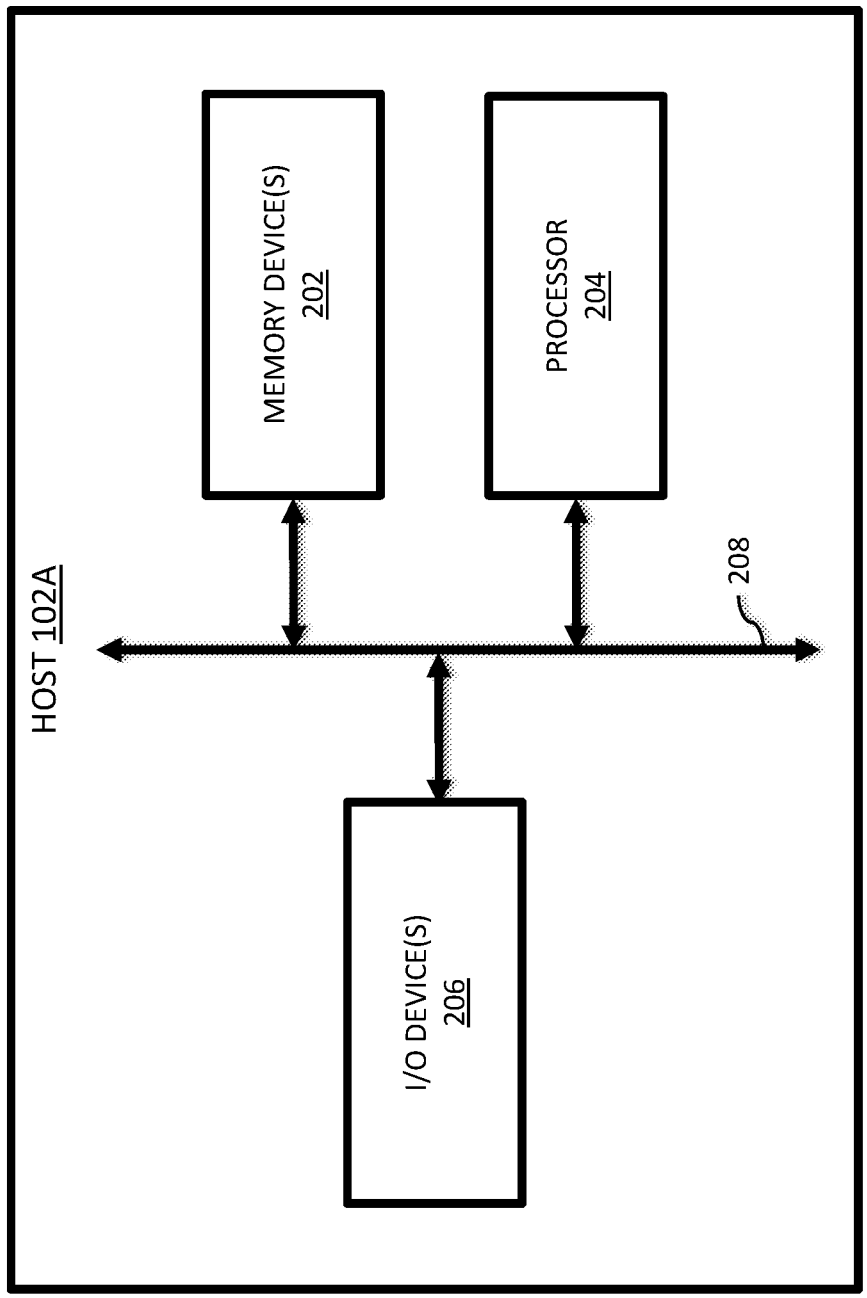
FIGS. 2A and 2B are schematic block diagrams illustrating various embodiments of a host included in the systems of FIGS. 1A through 1C.

With reference to FIG. 2A, FIG. 2A is a block diagram of one embodiment of a host 102A. At least in the illustrated embodiment, the host 102A includes, among other components, one or more memory devices 202, a processor 204, and one or more input/output (I/O) devices 206 coupled to and/or in communication with one another via a bus 208 (e.g., a wired and/or wireless bus).

A set of memory devices 202 may include any suitable quantity of memory devices 202. Further, a memory device 202 may include any suitable type of device and/or system that is known or developed in the future that can store computer-useable and/or computer-readable code. In various embodiments, a memory device 202 may include one or more non-transitory computer-usable mediums/media (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 204).

A memory device 202, in some embodiments, includes volatile computer-readable storage media. For example, a memory device 202 may include random-access memory (RAM), including dynamic RAM (DRAM), synchronous dynamic RAM (SDRAM), and/or static RAM (SRAM). In other embodiments, a memory device 202 may include non-volatile computer-readable storage media. For example, a memory device 202 may include a hard disk drive, a flash memory, and/or any other suitable non-volatile computer storage device that is known or developed in the future. In various embodiments, a memory device 202 includes both volatile and non-volatile computer-readable storage media.

Figure 3A:
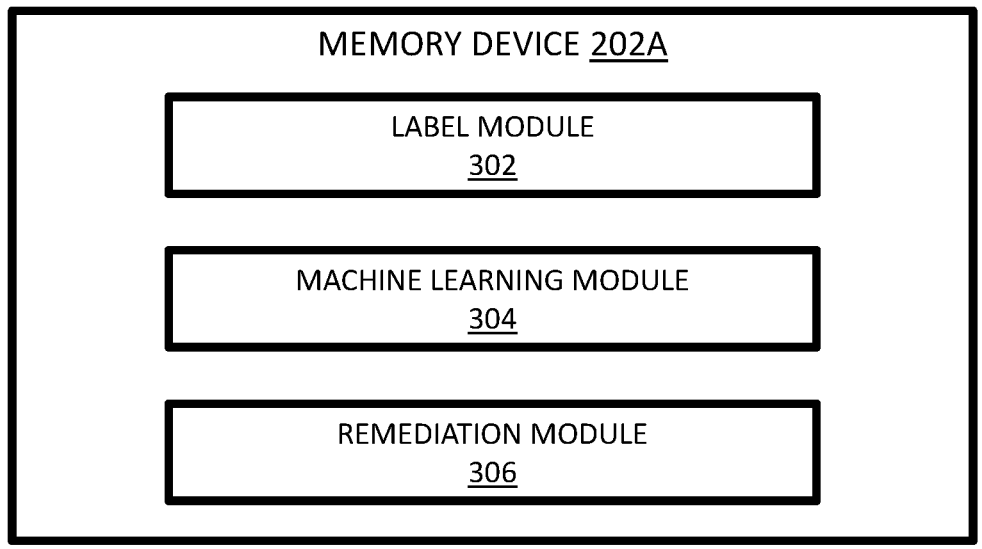
FIGS. 3A and 3B are schematic block diagrams illustrating various embodiments of a memory device included in the hosts of FIGS. 2A and 2B.

With reference now to FIG. 3A, FIG. 3A is a schematic block diagram of one embodiment of a memory device 202A. At least in the illustrated embodiment, the memory device 202A includes, among other components, a label module 302, a machine learning module 304, and a remediation module 306 that are each configured to cooperatively operate/function with one another when executed by the processor 204 to utilize machine learning to predict misconfigurations in a computing system under test.

A label module 302 may include any suitable hardware and/or software that can identify and/or label one or more nodes of a data graph structure. In various embodiments, a label module 302 is configured to receive a graph structure of a computing system under test, as discussed elsewhere herein (see, e.g., a graph module 310 in FIG. 3B). The graph structure of the computing system under test may include any suitable graph structure that is based on a converted model and/or diagram of a particular computing system under test, as further discussed elsewhere herein (see, e.g., a diagram module 308 in FIG. 3B).

In various embodiments, a label module 302 is configured to identify and label component nodes and/or or communication link nodes (or link nodes) of a data graph structure representing a computing system under test. An identified and/or labeled component node (or vertex node) may include any suitable component, device, apparatus, and/or system, etc. that can be included in and/or form a portion of a particular computing system under test. Example component nodes may include, but are not limited to, one or more nodes representing a trust boundary, a processing device (e.g., a processor), a memory device, a storage device, an input/output (I/O) device, a database, a software function/operation, a security gateway, a network, a subnet, an open port, a security control (e.g., a firewall), a Web application firewall, a security group, an authentication system, an authorization system, a HIDS/NIDS, and/or other controls, etc., among other components of a computing system that are possible and contemplated herein.

A link node may include any suitable type of communication link that is capable of enabling two or more component nodes in a computing system under test to be coupled to and/or in communication with each other. Example link nodes may include, but are not limited to, one or more nodes representing a communication channels, communication pathways, wireless and/or wired buses, point-to-point links, broadcast links, multi-point (multi-drop) links, point-to-multi-point links, private links, public links, uplinks, downlinks, forward links, reverse links, etc., among other communication links of a computing system that are possible and contemplated herein.

The label module 302 may identify a component node in a data graph of a computing system under test using any suitable technique and/or process that is known or developed in the future. Similarly, the label module 302 may identify a link node in a data graph of a computing system under test using any suitable technique and/or process that is known or developed in the future.

In various embodiments, the label module 302 may label one or more component nodes in a computing system under test. In some embodiments, the label module 302 is configured to label one or more specific component nodes and/or one or more component nodes for one or more types of component nodes. In certain embodiments, the label module 302 is configured to label each component node in a computing system under test. In other embodiments, the label module 302 is configured to label each component node in a specific type of component node in a computing system under test.

In various additional or alternative embodiments, the label module 302 may label one or more link nodes in a computing system under test. In some embodiments, the label module 302 is configured to label one or more specific link nodes and/or one or more link nodes for one or more types of link nodes. In certain embodiments, the label module 302 is configured to label each link node in a computing system under test. In other embodiments, the label module 302 is configured to label each link node in a specific type of link node in a computing system under test.

A label for the component node(s) and/or the link node(s) may include one or more known security vulnerabilities for a particular component node, type of component node, particular link node, and/or type of link node. In various embodiments, the known security vulnerability/vulnerabilities are associated with one or more attributes of a component node and/or link node (e.g., opened ports, encryptions, and/or the like attributes). Example vulnerabilities include, but are not limited to, a lack of threat protection, a lack of redundancy to support failover(s), failure to use one or more firewalls, insecurely storing one or more passwords, use of one or more clear text protocols, unauthenticated access to data storage, unauthorized access to data storage, one or more weak methods of authenticating one or more lambda functions, and/or one or more insecure methods of authenticating one or more lambda functions, etc., among other security vulnerabilities that a component and/or communication link of a computing system under test may be subject to that are possible and contemplated herein.

Various embodiments of the label module 302 are configured to transmit the data graph with the identified and/or labeled component node(s) and/or link node(s) to the machine learning module 304 for processing on the machine learning module 304. In addition, the machine learning module 304 is configured to receive the test environment 900 from the test environment module 410. Further, the machine learning module 304 is configured to receive the data graph with the identified and/or labeled component node(s) and/or link node(s) from the label module 302.

A machine learning module 304 may include any suitable hardware and/or software that can predict misconfigurations in a computing system under test. In various embodiments, the machine learning module 304 includes a machine learning algorithm that can be trained to predict misconfigurations in a computing system under test.

The machine learning algorithm may include any suitable code and/or algorithm that can be trained to predict and/or determine misconfigurations in a computing system under test. In various embodiments, the machine learning algorithm includes and/or defines a neural network, among other machine learning algorithms that are possible and contemplated herein. In certain embodiments, the neural network includes and/or defines a Deep Graph Convolutional Neural Network (DGCNN), among other neural networks that are possible and contemplated herein.

In various embodiments, the data graph with the identified and/or labeled component node(s) and/or link node(s) are fed into and received by the DGCNN and the DGCNN is trained to determine and/or predict one or more security vulnerabilities for the computing system under test based on the labeled component node(s) and/or link node(s) in the data graph. Here, a security vulnerability can also be referred to as, a system misconfiguration or simply, misconfiguration, since a misconfigured component and/or communication link can be the cause and/or root cause of a security vulnerability and/or vulnerability for a computing system (e.g., a computing system under test).

In some embodiments, the DGCNN is configured to determine and/or predict a misconfiguration (or security vulnerability) for the computing system under test based on the one or more attributes of a labeled component node. In additional or alternative embodiments, the DGCNN is configured to determine and/or predict a misconfiguration (or security vulnerability) for the computing system under test based on the one or more attributes of a labeled link node.

In certain embodiments, the DGCNN is configured to determine and/or predict a plurality of misconfigurations (security vulnerabilities) for the computing system under test based on the one or more attributes of a plurality of labeled component nodes. In additional or alternative embodiments, the DGCNN is configured to determine and/or predict a plurality of misconfigurations (security vulnerabilities) for the computing system under test based on the one or more attributes of a plurality of labeled link nodes.

In other embodiments, the DGCNN is configured to determine and/or predict a plurality of misconfigurations (security vulnerabilities) for the computing system under test based on the one or more attributes of one or more labeled component nodes and the one or more attributes of one or more labeled link nodes. In further embodiments, the DGCNN is configured to determine and/or predict all of the misconfigurations (security vulnerabilities) for the computing system under test based on the one or more attributes of each/all of the labeled component nodes and the one or more attributes of each/all of the labeled link nodes.

The machine learning module 304 is configured to transmit the predicted and/or determined misconfiguration(s) (security vulnerability/vulnerabilities) to a remedial module 306. Further, the remedial module 306 is configured to receive the predicted and/or determined misconfiguration(s) (security vulnerability/vulnerabilities) from the machine learning module 304.

A remedial module 306 may include any suitable hardware and/or software that can calculate and/or determine one or more modifications to a computing system under test. In various embodiments, the modification(s) calculated and/or determined by the remedial module 306 can correct and/or at least mitigate the misconfiguration(s) and/or the one or more security vulnerabilities determined/predicted by the machine learning module 304.

The calculated and/or determined modification(s) can be any suitable set of modifications that can correct and/or at least mitigate the misconfiguration(s) and/or the one or more security vulnerabilities determined/predicted by the machine learning module 304. As each computing system under test may include a different configuration and/or topology, the modification(s) for a computing system under test calculated and/or determined by the remedial module 306 will be tailored and/or specific to the particular computing system under test and be based on the determined/predicted misconfiguration(s) and/or the one or more security vulnerabilities.

For example, in response to the machine learning module 304 (e.g., the machine learning algorithm, neural network, DGCNN, etc.) determining that a computing system under test is insecurely storing one or more passwords, the remedial module 306 can calculate and/or determine one or more modifications (e.g., hardware modification(s) and/or software modification(s)) to the computing system under test so that the password(s) are securely stored and/or at least more securely stored. While this example is a specific example, the various embodiments disclosed herein are not limited to this example. That is, the various embodiments disclosed herein are capable of determining/predicting one or more other types of misconfigurations and/or security vulnerabilities for a computing system under test and calculating/determining one or more other types of modifications to a computing system under test based on the determined/predicted type(s) of misconfigurations and/or security vulnerabilities.

The remedial module 306, in various embodiments, is configured to notify a user of the modification(s) that the remedial module 306 calculate and/or determined. That is, the remedial module 306 can recommend to the user one or more hardware modifications and/or one or more software modifications to the computing system under test that would correct and/or at least mitigate the misconfiguration(s) and/ or the one or more security vulnerabilities of the computing system under test. In additional embodiments, the remedial module 306 can notify the user of the misconfiguration(s) and/or the one or more security vulnerabilities of the computing system under test predicted/determined by the machine learning module 304.

Figure 3B:
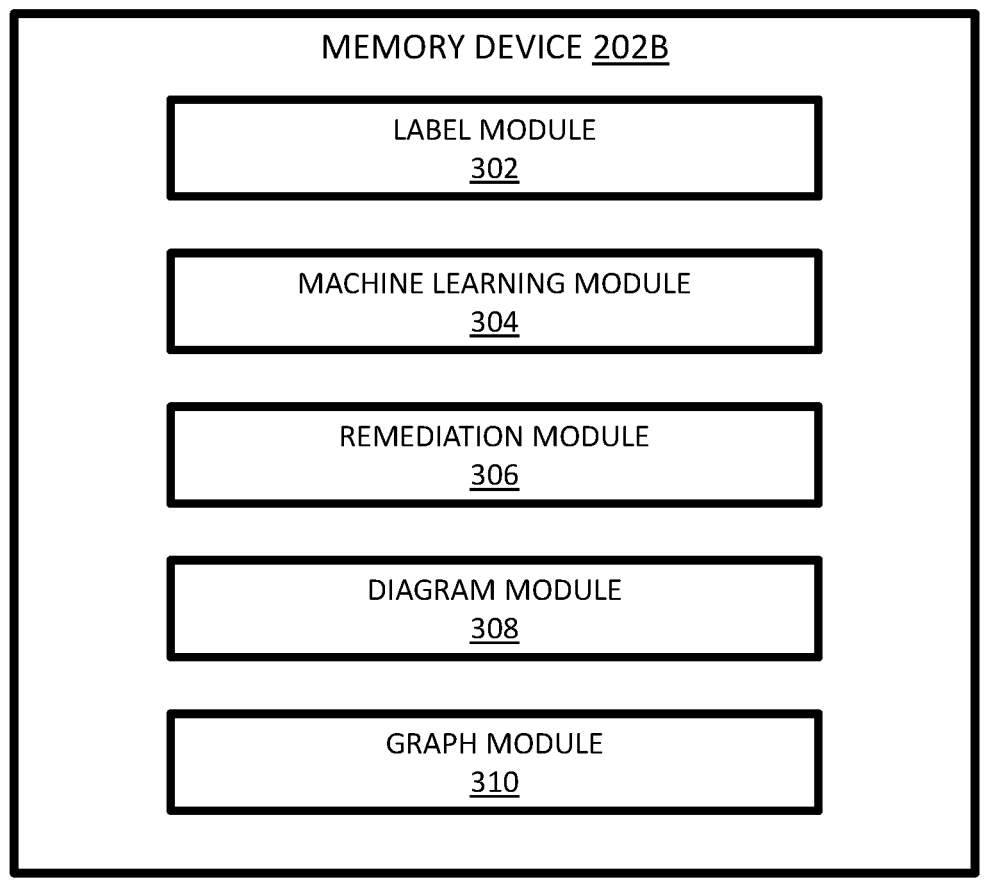

Referring now to FIG. 3B, FIG. 3B is a schematic block diagram of one embodiment of a memory device 202B. At least in the illustrated embodiment, the memory device 202B includes a label module 302, a machine learning module 304, and a remediation module 306 similar to the label module 302, machine learning module 304, and remediation module 306 included in the memory device 202A discussed with reference to FIG. 3A. At least in the illustrated embodiment, the memory device 202B further includes, among other components, a diagram module 308 and a graph module 310 that are each configured to cooperatively operate/function with one another and the label module 302, machine learning module 304, and remediation module 306 when executed by the processor 204 to utilize machine learning to predict misconfigurations in a computing system under test.

A diagram module 308 may include any suitable hardware and/or software that can generate a diagram and/or model of a computing system under test (e.g., an actual computing system or a proposed computing system). In additional or alternative embodiments, a diagram module 308 may include any suitable hardware and/or software that can receive a diagram and/or model of a computing system under test (e.g., from a client device 104).

A diagram module 308 may generate a diagram and/or model of a computing system under test using any suitable technique and/or process that is capable of generating a diagram and/or model of a computing system under test. In various embodiments, the diagram module 308 is configured to generate a diagram and/or model of a computing system under test based on a computing system that actually exists to test the actual computing system. In other embodiments, the diagram module 308 is configured to generate a diagram and/or model of a computing system under test based on a proposed computing system and/or a computing system that includes one or more predetermined/pre-defined criteria.

In some embodiments, the diagram module 308 is configured to receive (e.g., from a client device 104 and/or via scanning into the host 102) a diagram and/or model of a computing system under test based on a computing system that actually exists to test the actual computing system. In other embodiments, the diagram module 308 is configured to receive the diagram and/or model of the computing system under test based on a proposed computing system and/or a computing system that includes one or more predetermined/pre-defined criteria.

The diagram module 308 is configured to transmit the diagram and/or model of the computing system under test to a graph module 310. The graph module 310 is configured to receive the diagram and/or model of the computing system under test from the diagram module 308.

A graph module 310 may include any suitable hardware and/or software that can convert a diagram/model of a computing system under test to a data graph structure of the computing system under test. The graph module 310 may convert the diagram/model of a computing system under test to a data graph structure of the computing system under test using any suitable technique and/or process capable of performing such conversion.

At the data transforming stage, various embodiments of a graph module 310 are configured to convert system components to graph nodes/vertices and/or the communication links between various graph nodes/vertices to graph link nodes/edges in the data graph structure. The graph nodes and/or link nodes, in various embodiments, include one or more attributes (e.g., opened ports, encryptions, etc.) as respective features of the graph nodes and/or link nodes.

The attribute(s) can be utilized as the basis for identifying one or more security vulnerabilities for each graph node and/or each link node. Further, the identified one or more security vulnerabilities can be utilized to determine and/or predict one or more misconfigurations for the computing system under test, as discussed elsewhere herein.

The graph module 310 is further configured to transmit the data graph structure to a label module 306. The label module 306 is configured to receive the data graph structure and identify and/or label the one or more graph nodes and/or the one or more link nodes included therein, as discussed elsewhere herein.

Referring back to FIG. 2A, a processor 204 may include any suitable non-volatile/persistent hardware and/or software configured to perform and/or facilitate performing functions and/or operations for predicting misconfigurations in a computing system. In various embodiments, the processor 204 includes hardware and/or software for executing instructions in one or more modules and/or applications that can perform and/or facilitate performing functions and/or operations for predicting misconfigurations in a computing system. The modules and/or applications executed by the processor 204 for predicting misconfigurations in a computing system can be stored on and executed from one or more memory devices 202 and/or from the processor 204.

Figure 4A:
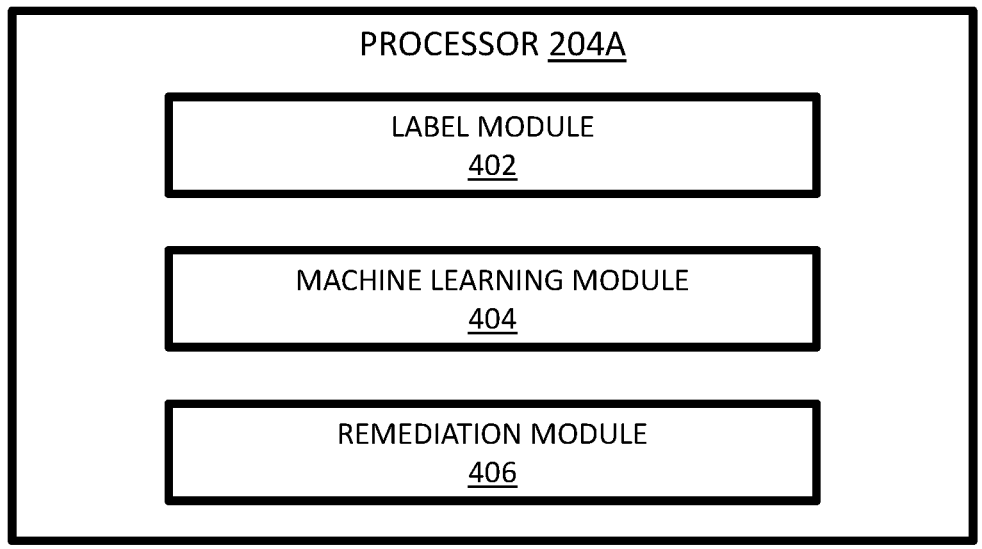
FIGS. 4A and 4B are schematic block diagrams illustrating various embodiments of a processor included in the hosts of FIGS. 2A and 2B.

With reference to FIG. 4A, FIG. 4A is a schematic block diagram of one embodiment of a processor 204A. At least in the illustrated embodiment, the processor 204A includes, among other components, a label module 402, a machine learning module 404, and a remediation module 406 that are each configured to cooperatively operate/function with one another when executed by the processor 204A to predict misconfigurations in a computing system similar to the label module 302, machine learning module 304, and test module 306 discussed with reference to the memory device 202A illustrated in FIG. 3A.

Figure 4B:
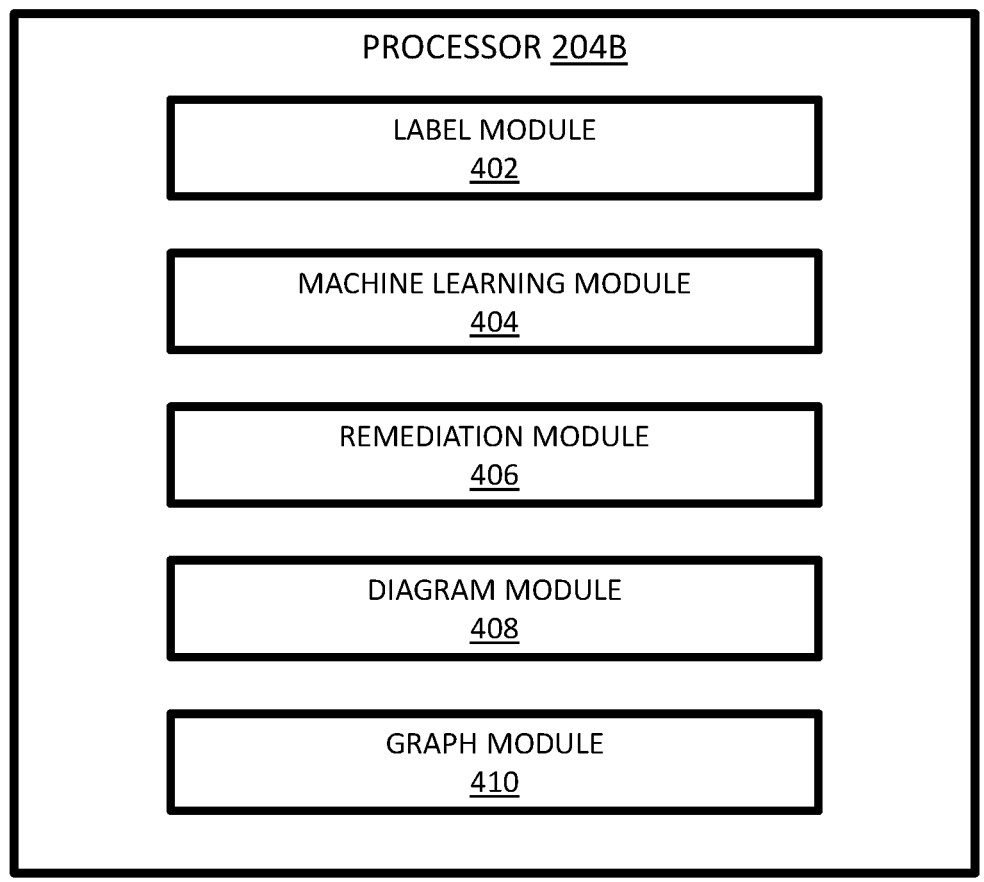

Referring to FIG. 4B, FIG. 4B is a schematic block diagram of another embodiment of a processor 204B. At least in the illustrated embodiment, the processor 204B includes, among other components, a label module 402, a machine learning module 404, a remediation module 406, a diagram module 408, and a graph module 410 that are each configured to cooperatively operate/function with one another when executed by the processor 204B to predict misconfigurations in a computing system similar to the label module 302, machine learning module 304, test module 306, diagram module 308, and graph module 310 discussed with reference to the memory device 202B illustrated in FIG. 3B.

With reference again to FIG. 2A, an I/O device 206 may include any suitable I/O device that is known or developed in the future. In various embodiments, the I/O device 206 is configured to enable the host 102A to communicate with one or more external devices and/or entities (e.g., a client device 104).

Figure 2B:
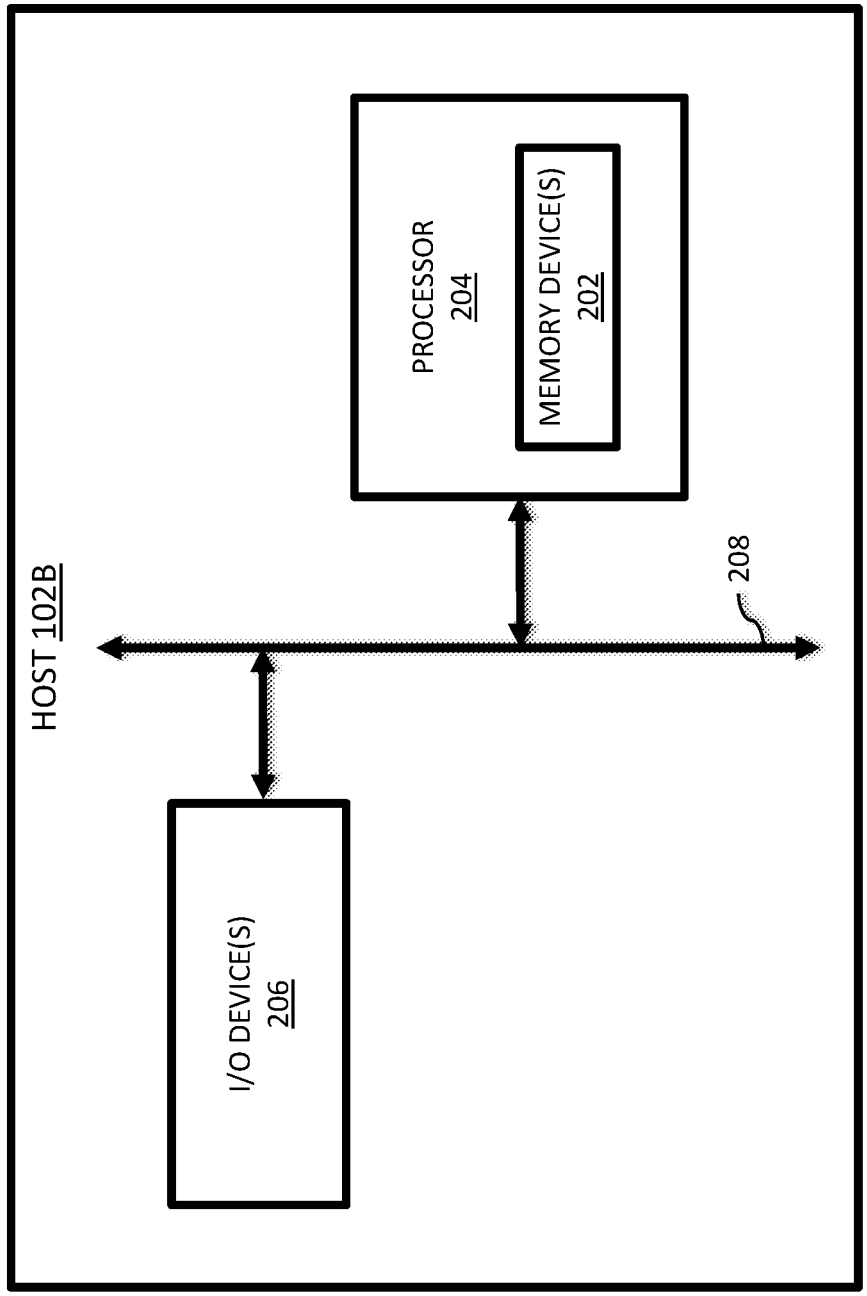

Turning now to FIG. 2B, FIG. 2B is a block diagram of another embodiment of a host 102B. The host 102B includes, among other components, one or more memory devices 202, a processor 204, and one or more I/O devices 206 similar to the host 102A discussed elsewhere herein. Alternative to the host 102A, the processor 204 in the host 102B includes the memory device(s) 202 as opposed to the memory device(s) 202 of the host 102A being a different device than and/or independent of the processor 204.

With reference again to FIGS. 1B and 1C, a client device 104 may include any suitable electronic system, set of electronic devices, software, and/or set of applications capable of performing the operations and/or functions disclosed herein. In various embodiments, the client device 104 is configured to provide a model and/or diagram of a computing system under test to a host 102 (e.g., diagram module 308).

Figure 5A:
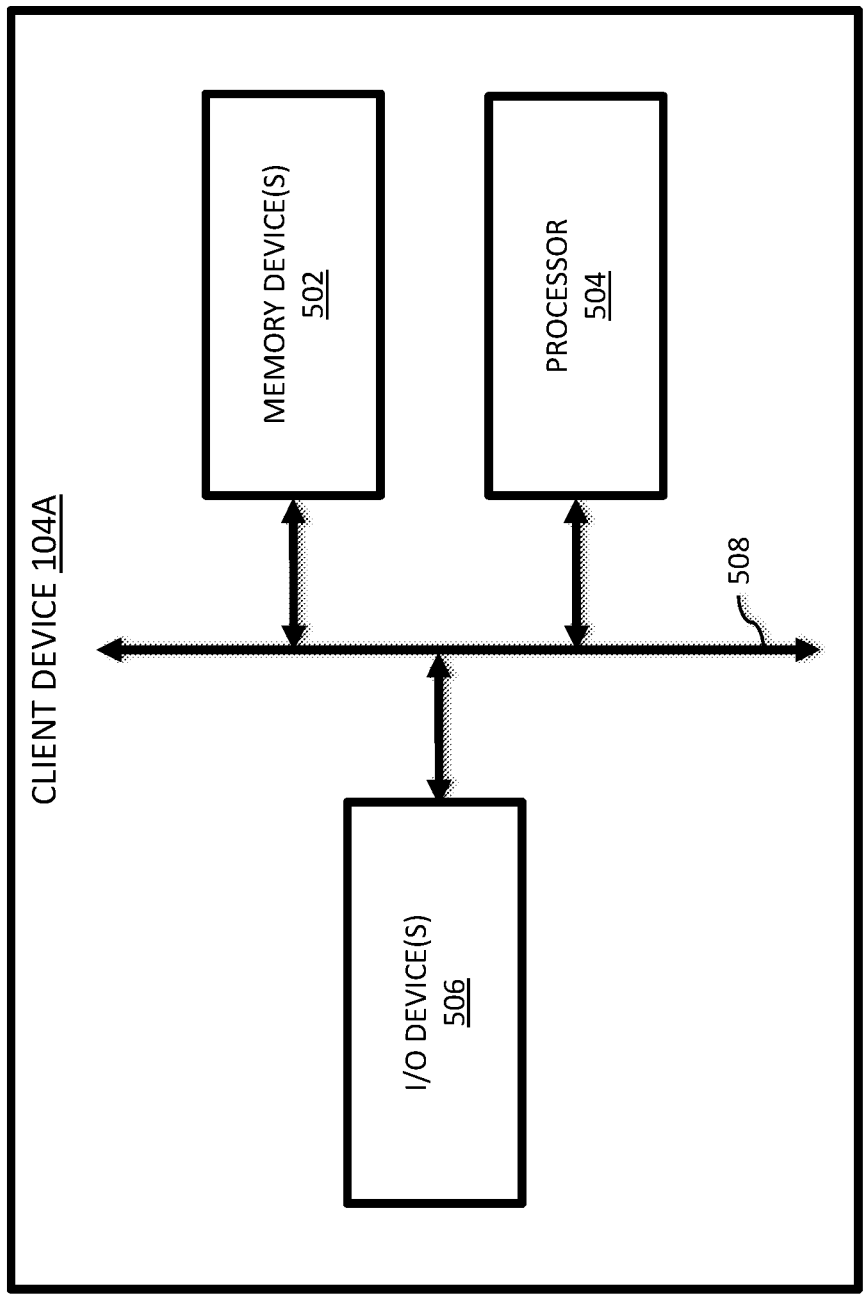
FIGS. 5A and 5B are schematic block diagrams illustrating various embodiments of a client device included in the systems of FIGS. 1A through 1C.

With reference to FIG. 5A, FIG. 5A is a block diagram of one embodiment of a client device 104A. At least in the illustrated embodiment, the client device 104A includes, among other components, one or more memory devices 502, a processor 504, and one or more I/O devices 506 coupled to and/or in communication with one another via a bus 508 (e.g., a wired and/or wireless bus), in which the I/O device(s) 506 are similar to the I/O device(s) 206 discussed elsewhere herein.

A set of memory devices 502 may include any suitable quantity of memory devices 502. Further, a memory device 502 may include any suitable type of device and/or system that is known or developed in the future that can store computer-useable and/or computer-readable code. In various embodiments, a memory device 502 may include one or more non-transitory computer-usable mediums/media (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 504).

A memory device 502, in some embodiments, includes volatile computer-readable storage media. For example, a memory device 502 may include random-access memory (RAM), including dynamic RAM (DRAM), synchronous dynamic RAM (SDRAM), and/or static RAM (SRAM). In other embodiments, a memory device 502 may include non-volatile computer-readable storage media. For example, a memory device 502 may include a hard disk drive, a flash memory, and/or any other suitable non-volatile computer storage device that is known or developed in the future. In various embodiments, a memory device 502 includes both volatile and non-volatile computer-readable storage media.

Figure 6:
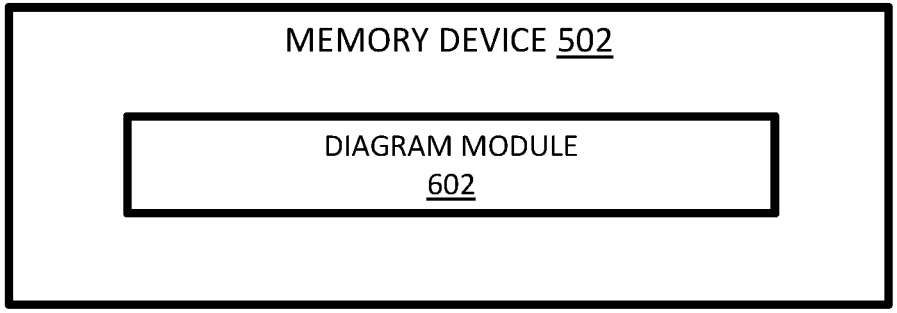
FIG. 6 is a schematic block diagram illustrating one embodiment of a memory device included in the client devices of FIGS. 5A and 5B.

With reference now to FIG. 6, FIG. 6 is a schematic block diagram of one embodiment of a memory device 502. At least in the illustrated embodiment, the memory device 502 includes, among other components, a diagram module 602 that is configured to operate/function when executed by the processor 504 to receive a diagram of a computing system under test and/or generate a diagram of a computing system under test.

A diagram module 602 may include any suitable hardware and/or software that can generate a diagram and/or model of a computing system under test (e.g., an actual computing system or a proposed computing system). In additional or alternative embodiments, a diagram module 602 may include any suitable hardware and/or software that can receive a diagram and/or model of a computing system under test (e.g., from a user).

A diagram module 602 may generate a diagram and/or model of a computing system under test using any suitable technique and/or process that is capable of generating a diagram and/or model of a computing system under test. In various embodiments, the diagram module 602 is configured to generate a diagram and/or model of a computing system under test based on a computing system that actually exists to test the actual computing system. In other embodiments, the diagram module 602 is configured to generate a diagram and/or model of a computing system under test based on a proposed computing system and/or a computing system that includes one or more predetermined/pre-defined criteria.

In some embodiments, the diagram module 602 is configured to receive (e.g., from a user and/or via scanning into the client device 104) a diagram and/or model of a computing system under test based on a computing system that actually exists to test the actual computing system. In other embodiments, the diagram module 602 is configured to receive the diagram and/or model of the computing system under test based on a proposed computing system and/or a computing system that includes one or more predetermined/pre-defined criteria.

The diagram module 602 is configured to transmit the diagram and/or model of the computing system under test to a host device 102 and/or diagram module 308 included in the host device 102. The host device 102 and/or diagram module 308 is/are configured to receive the diagram and/or model of the computing system under test from the client device 104 and/or diagram module 602, as discussed elsewhere herein.

Referring back to FIG. 5A, a processor 504 may include any suitable non-volatile/persistent hardware and/or software configured to perform and/or facilitate performing processing functions and/or operations. In various embodiments, the processor 504 includes hardware and/or software for executing instructions in one or more modules and/or applications that can perform and/or facilitate performing functions and/or operations for receiving and/or generating a model and/or diagram of a computing system under test. The modules and/or applications executed by the processor 504 for receiving and/or generating a model and/or diagram of a computing system under test can be stored on and executed from one or more memory devices 502 and/or from the processor 504.

Figure 7:
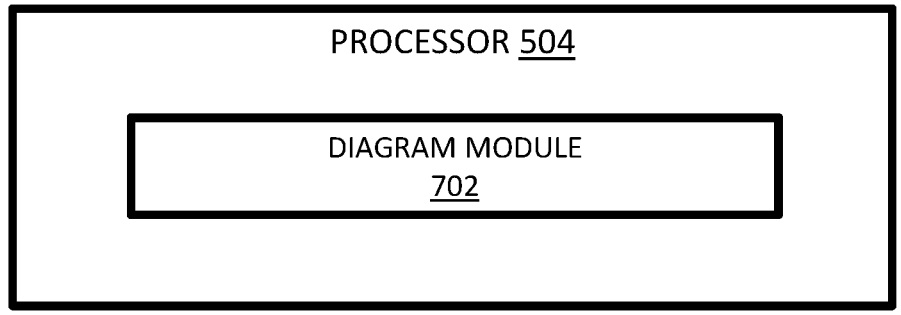
FIG. 7 is a schematic block diagram illustrating one embodiment of a processor included in the client devices of FIGS. 5A and 5B.

With reference to FIG. 7, FIG. 7 is a schematic block diagram of one embodiment of a processor 504. At least in the illustrated embodiment, the processor 504 includes, among other components, a diagram module 702 that is configured to operate/function when executed by the processor 504 to receive and/or generate a model and/or diagram of a computing system under test similar to the diagram module 602 discussed with reference to the memory device 502 illustrated in FIG. 6.

Figure 5B:
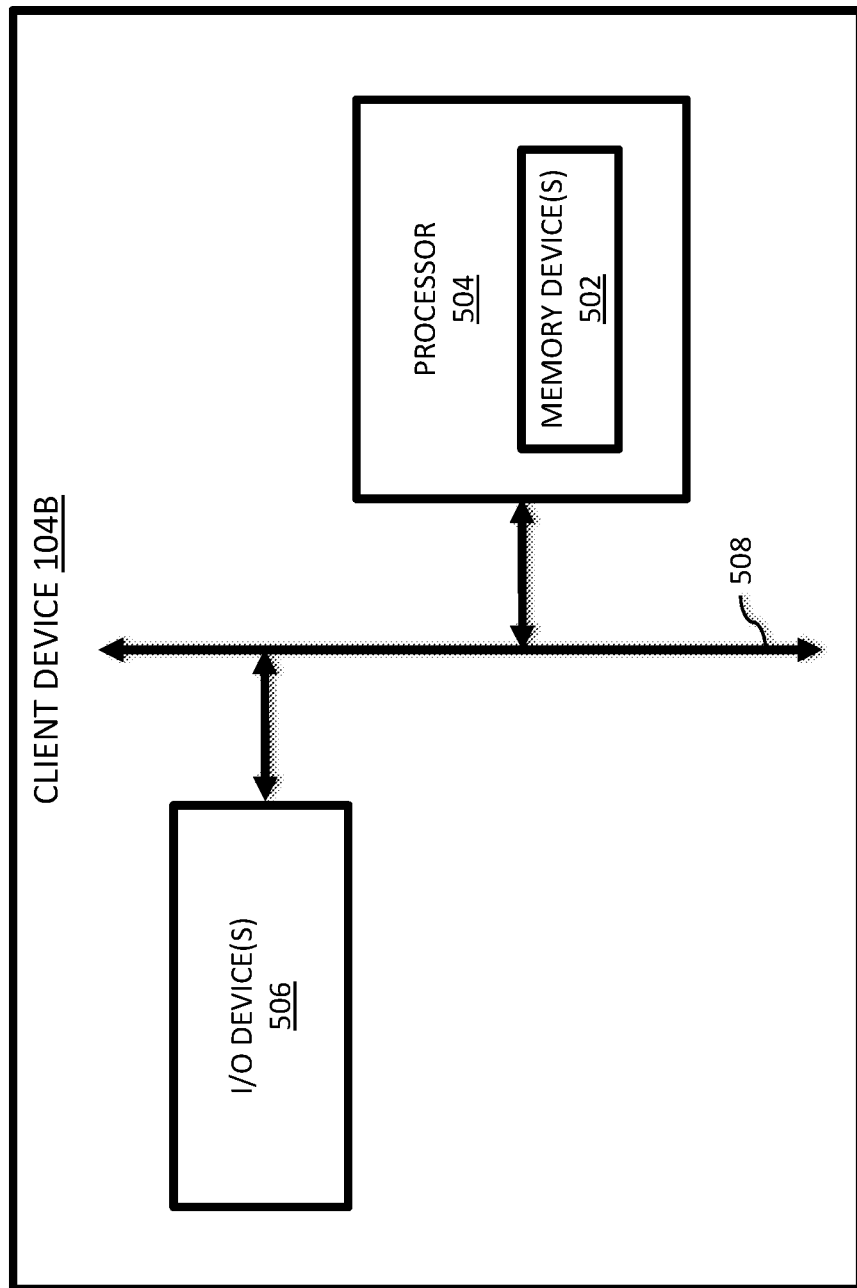

Turning now to FIG. 5B, FIG. 5B is a block diagram of another embodiment of a client device 104B. The client device 104B includes, among other components, one or more memory devices 502, a processor 504, and one or more I/O devices 506 similar to the client device 104A discussed elsewhere herein. Alternative to the client device 104A, the processor 504 in the client device 104B includes the memory device(s) 502 as opposed to the memory device(s) 502 of the client device 104A being a different device than and/or independent of the processor 504.

Referring again to FIG. 1C, network 106 is configured to connect and/or couple a host and a client device 104 to one another so that the host 102 and the client device 104 are in communication with each other. The network 106 may include any suitable wired and/or wireless network that is known or developed in the future that enables the host 102 and the client device 104 to be coupled to and/or in communication with one another and/or to share resources.

In various embodiments, the network 106 may include the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of communicating and/or sharing resources with one another that are possible and contemplated herein.

The various embodiments disclosed herein utilize an Artificial Intelligence (AI) model (e.g., machine learning) to analyze diagram data against a library of zero-trust deployment templates for one or more component nodes/vertices and/or one or more communication links and/or link nodes. The AI model can recognize trust boundaries (e.g., networks, subnets, etc.), open ports, security controls (e.g., firewalls), Web application firewalls, security groups, authentication system, and/or authorization systems, security gateways, HIDS/NIDS, and/or other controls. The AI model can further identify and/or determined a zero-trust architecture template that matches one or more modifications to correct and/or at least mitigate one or more misconfigurations in the computing system under test. In some embodiments, the modification(s) provide an optimum and/or best way to a corrective solution.

In certain embodiments, a trained AI model utilizes, for example, an S3 bucket, one or more Lambda functions, and one or more databases to offer suggestions and/or make changes to a computing system under test that will be compliant to security requirements, as well as suggest deployment scripts or services for the computing system under test. Further, in making the suggestion(s) and/or modification(s), the AI model can be tuned to comply with company specific security requirements and/or use company specific security services as a basis for the suggestion(s) and/or modification(s).

At a data transforming stage, system components in a diagram of a computing system under test are converted to a data graph that includes one or more graph nodes/vertices and one or more communication links graph nodes are converted to one or more graph links/edges and/or link nodes. The graph nodes and link nodes, in various embodiments, include one or more attributes of one or more of the components and/or one or more of the communication links. The graph nodes and link nodes are then labeled with one or more known security vulnerabilities.

At a training stage of the AI model, the labeled data are fed into a graph-based classification model (e.g., a DGCNN) for training. At a prediction stage, new system deployment diagram data are converted to the graph data structure and passed into a graph classification model. The prediction output may include one or more or all of the possible misconfigurations in the computing system under test that can cause a security vulnerability determined by the AI model.

At a remediation stage, the AI model can offer one or more suggestions to mitigate one or more of the misconfigurations based on the model prediction results. In some embodiments, the misconfiguration(s) can include one or more security vulnerabilities.

Figure 8:
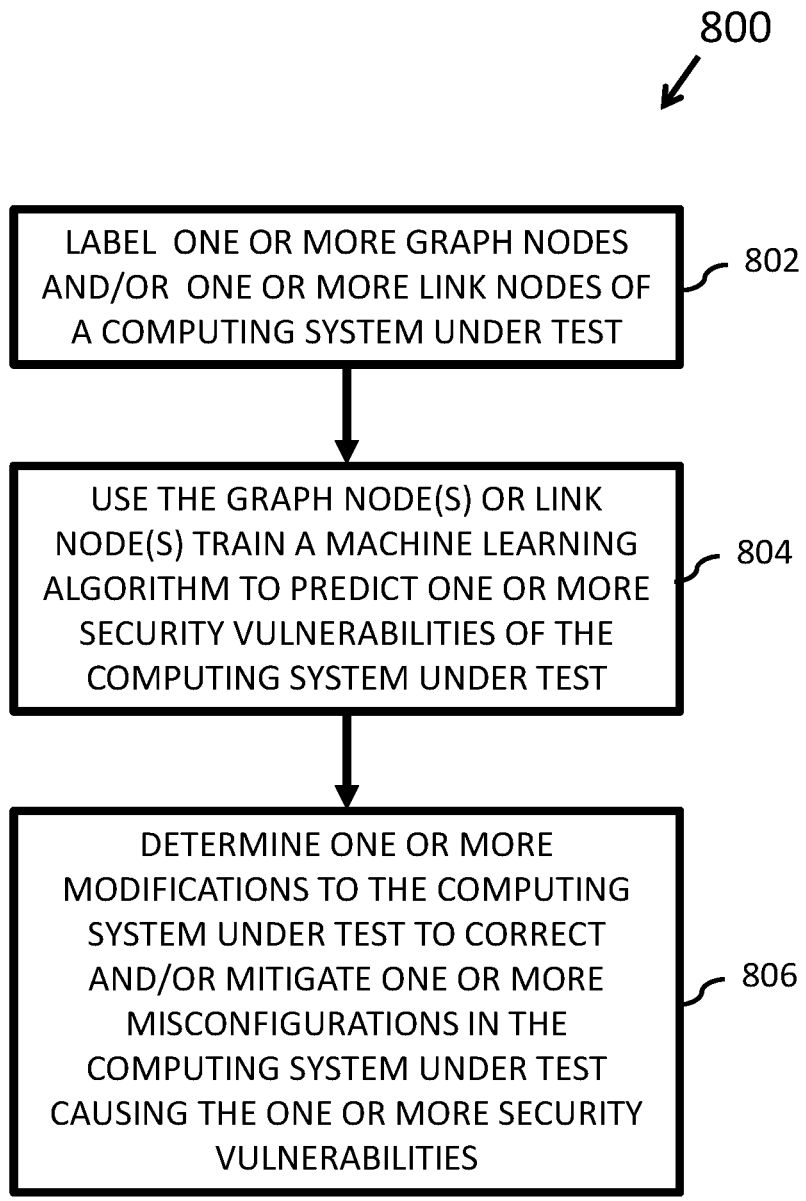
FIGS. 8 through 10 are schematic flow chart diagrams illustrating various embodiments of a method for predicting misconfigurations in a computing system using machine learning.

FIG. 8 is a schematic flow chart diagram illustrating one embodiment of a method 800 for predicting misconfigurations in a computing system using machine learning. At least in the illustrated embodiment, the method 800 begins by a processor (e.g., processor 204) labeling one or more graph nodes and/or one or more one or more link nodes of a data graph structure for a computing system under test (block 802). The graph node(s) and/or link node(s) include one or more attributes and can be labeled with one or more known security vulnerabilities that may be associated with the attribute(s), as discussed elsewhere herein.

The method 800 further includes the processor 204 using the labeled graph node(s) and/or link node(s) to train a machine learning algorithm to predict one or more security vulnerabilities for the computing system under test (block 804). The one or more predicted security vulnerabilities are related to the attribute(s) of the graph node(s) and/or link node(s) and may include any of the security vulnerabilities discussed elsewhere herein. Further, the machine learning algorithm may include any of the machine learning algorithms, techniques, and/or structures, as discussed elsewhere herein. In some embodiments, the machine learning algorithm includes a neural network and/or a Deep Graph Convolutional Neural Network.

The processor 204 further determines one or more modifications to the system under test to correct and/or at least mitigate one or more misconfigurations in the computing system under test causing the predicted one or more security vulnerabilities for the computing system under test (block 806). The modification(s) can include any modification capable of correcting and/or at least mitigating the misconfiguration(s) in the computing system under test causing the predicted one or more security vulnerabilities, as discussed elsewhere herein. Further, the modification(s) can correct and/or at least mitigate one or more or all of the misconfigurations in the computing system under test causing the predicted one or more security vulnerabilities, as discussed elsewhere herein.

Figure 9:
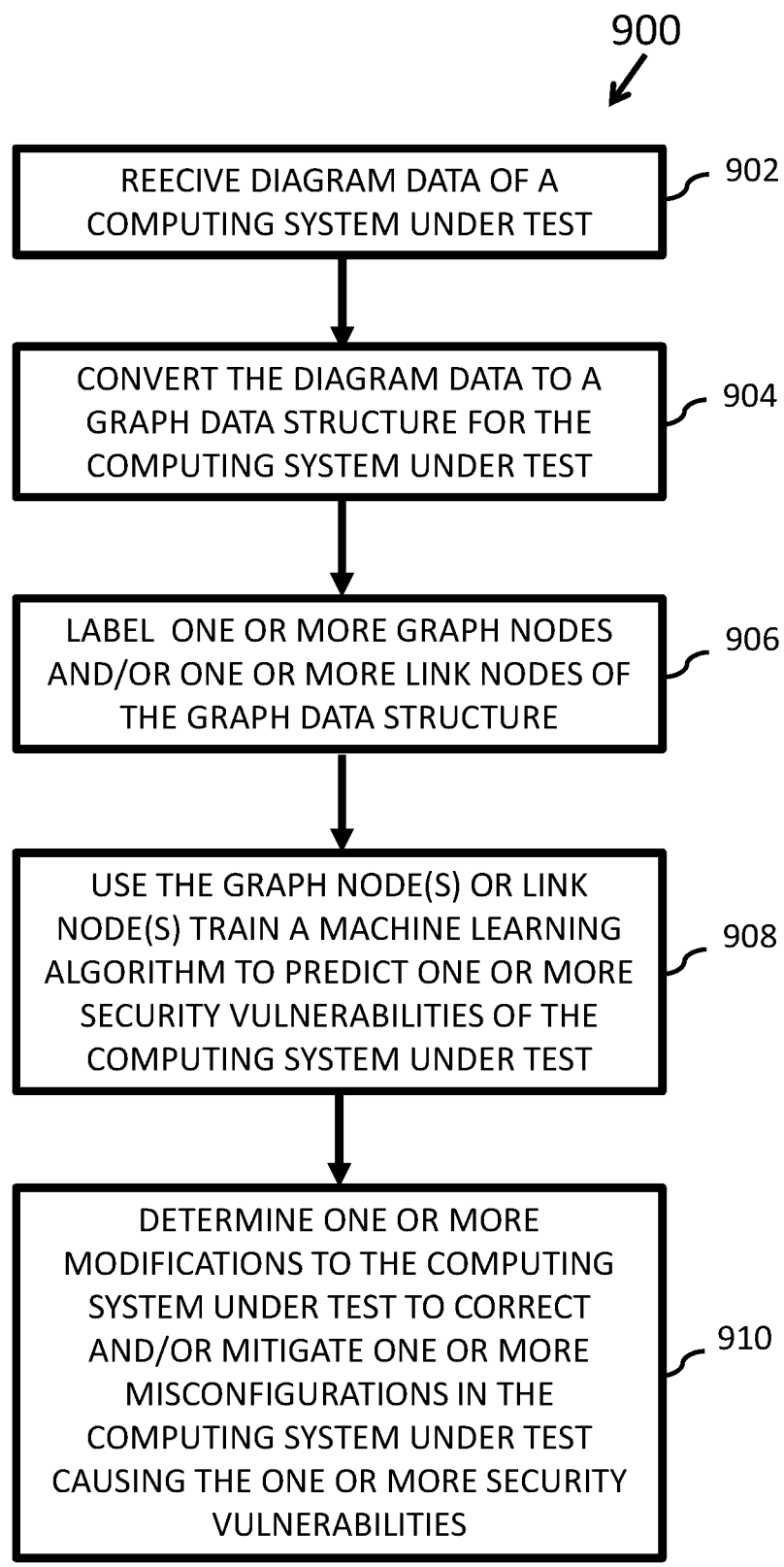

FIG. 9 is a schematic flow chart diagram illustrating another embodiment of a method 900 for predicting misconfigurations in a computing system using machine learning. At least in the illustrated embodiment, the method 900 begins by a processor (e.g., processor 204) receiving diagram data of a computing system under test (block 902). The diagram data can be received from a user and/or a client device 104 (e.g., a diagram module 602/702), as discussed elsewhere herein.

The processor 204 converts the diagram data to a graph data structure of the computing system under test (block 904). The diagram data can be converted to the graph data structure using any of the techniques and/or operations discussed elsewhere herein.

The method 900 further includes the processor 204 labeling one or more graph nodes and/or one or more one or more link nodes of a data graph structure for a computing system under test (block 906). The graph node(s) and/or link node(s) include one or more attributes and can be labeled with one or more known security vulnerabilities that may be associated with the attribute(s), as discussed elsewhere herein.

The processor 204 uses the labeled graph node(s) and/or link node(s) to train a machine learning algorithm to predict one or more security vulnerabilities for the computing system under test (block 908). The one or more predicted security vulnerabilities are related to the attribute(s) of the graph node(s) and/or link node(s) and may include any of the security vulnerabilities discussed elsewhere herein. Further, the machine learning algorithm may include any of the machine learning algorithms, techniques, and/or structures, as discussed elsewhere herein. In some embodiments, the machine learning algorithm includes a neural network and/or a Deep Graph Convolutional Neural Network.

The processor 204 further determines one or more modifications to the system under test to correct and/or at least mitigate one or more misconfigurations in the computing system under test causing the predicted one or more security vulnerabilities for the computing system under test (block 910). The modification(s) can include any modification capable of correcting and/or at least mitigating the misconfiguration(s) in the computing system under test causing the predicted one or more security vulnerabilities, as discussed elsewhere herein. Further, the modification(s) can correct and/or at least mitigate one or more or all of the misconfigurations in the computing system under test causing the predicted one or more security vulnerabilities, as discussed elsewhere herein.

Figure 10:
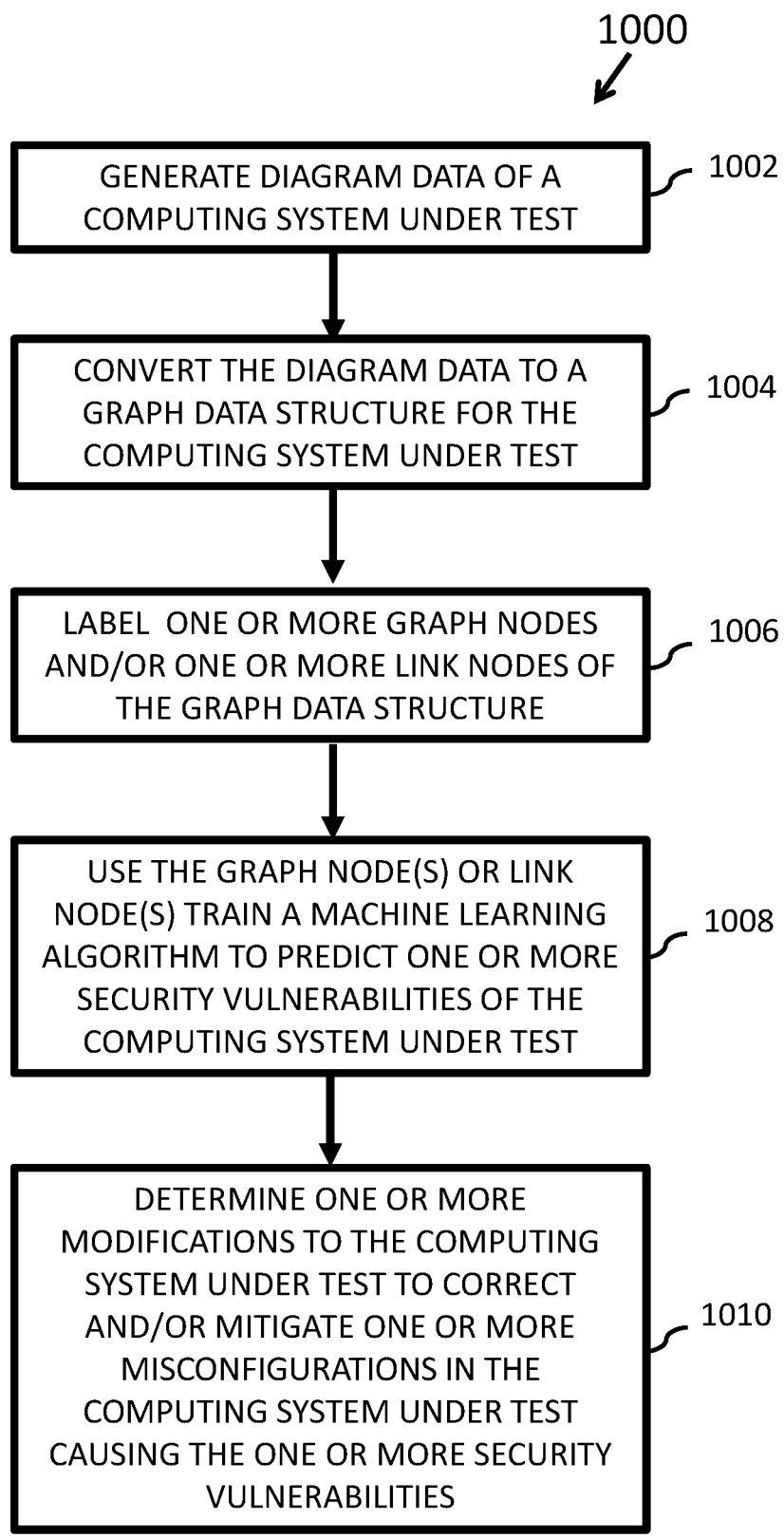

FIG. 10 is a schematic flow chart diagram illustrating another embodiment of a method 1000 for predicting misconfigurations in a computing system using machine learning. At least in the illustrated embodiment, the method 1000 begins by a processor (e.g., processor 204) generating diagram data of a computing system under test (block 1002). The diagram data can be generated using any of the techniques and/or operations, as discussed elsewhere herein.

The processor 204 converts the diagram data to a graph data structure of the computing system under test (block 1004). The diagram data can be converted to the graph data structure using any of the techniques and/or operations discussed elsewhere herein.

The method 900 further includes the processor 204 labeling one or more graph nodes and/or one or more one or more link nodes of a data graph structure for a computing system under test (block 1006). The graph node(s) and/or link node(s) include one or more attributes and can be labeled with one or more known security vulnerabilities that may be associated with the attribute(s), as discussed elsewhere herein.

The processor 204 uses the labeled graph node(s) and/or link node(s) to train a machine learning algorithm to predict one or more security vulnerabilities for the computing system under test (block 1008). The one or more predicted security vulnerabilities are related to the attribute(s) of the graph node(s) and/or link node(s) and may include any of the security vulnerabilities discussed elsewhere herein. Further, the machine learning algorithm may include any of the machine learning algorithms, techniques, and/or structures, as discussed elsewhere herein. In some embodiments, the machine learning algorithm includes a neural network and/or a Deep Graph Convolutional Neural Network.

The processor 204 further determines one or more modifications to the system under test to correct and/or at least mitigate one or more misconfigurations in the computing system under test causing the predicted one or more security vulnerabilities for the computing system under test (block 1010). The modification(s) can include any modification capable of correcting and/or at least mitigating the misconfiguration(s) in the computing system under test causing the predicted one or more security vulnerabilities, as discussed elsewhere herein. Further, the modification(s) can correct and/or at least mitigate one or more or all of the misconfigurations in the computing system under test causing the predicted one or more security vulnerabilities, as discussed elsewhere herein.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory configured to store code executable by the processor to:
automatically identify and label, with a respective component node label, one or more graph component nodes of a data graph representing a computing system under test, wherein each labeled graph component node includes one or more component node security vulnerabilities for the computing system under test;
automatically identify and label, with a respective communication link label, one or more graph communication links between graph component nodes of the data graph, wherein each labeled graph communication link includes one or more communication link security vulnerabilities between graph component nodes for the computing system under test;
utilize the one or more automatically identified and labeled graph component nodes and the one or more automatically identified and labeled graph communication links of the data graph to train a machine learning algorithm to predict one or more misconfigurations in the computing system under test based on the one of the one or more component node security vulnerabilities included in each component node label for the one or more graph component nodes and the one or more communication link security vulnerabilities included in each communication link label for the one or more graph communication links; and
determine one or more modifications to the computing system under test for mitigating the one or more misconfigurations predicted by the machine learning algorithm.

2. The apparatus of claim 1, wherein the code executable by the processor further causes the processor to:
convert diagram data of the computing system into the graph data,
wherein:
the computing system including system nodes coupled to each other via a respective system communication link,
the graph component nodes represent each respective system node, and
the graph communication links represent each respective system communication link.

3. The apparatus of claim 2, wherein the code executable by the processor further causes the processor to one of:
receive the diagram data from a user in response to the user generating the diagram data; and
generate the diagram data in response to receiving data for the computing system from the user.

4. The apparatus of claim 1, wherein the code executable by the processor further causes the processor to:
automatically identify and label the one or more graph component nodes of the data graph of the computing system with a respective component node label;
automatically identify and label the one or more graph communication links between graph component nodes of the data graph of the computing system with a respective communication link label; and utilize the one or more labeled graph nodes and the one or more labeled communication links to train a neural network to predict the one or more misconfigurations in the computing system based on the one or more component node security vulnerabilities included in the respective component node labels for the one or more labeled graph component nodes and based on the one or more communication link security vulnerabilities included in the respective communication link labels for the one or more labeled communication links.

5. The apparatus of claim 1, wherein the code executable by the processor further causes the processor to:
automatically identify and label each graph component node of the data graph of the computing system with a respective component node label;
automatically identify and label each graph communication link between graph component nodes of the data graph of the computing system with a respective communication link label; and
utilize each graph component node and each communication link of the data graph to train a neural network to predict the one or more misconfigurations in the computing system based on the one or more component node security vulnerabilities included in each respective component node label for the graph component nodes and based on the one or more communication link security vulnerabilities included in each respective communication link label for the communication links.

6. The apparatus of claim 1, wherein:
the code executable by the processor further causes the processor to provide the one or more modifications to the computing system to a user; and
the one or more modifications mitigate one of all of the misconfigurations and a subset of the misconfigurations.

7. The apparatus of claim 1, wherein the machine learning algorithm comprises a Deep Graph Convolutional Neural Network.

8. A method, comprising:
performing, by a processor, each of:
automatically identifying and labeling, with a respective component node label, one or more graph component nodes of a data graph representing a computing system under test, wherein each labeled graph component node includes one or more component node security vulnerabilities for the computing system under test; and
automatically identifying and labeling, with a respective communication link label, one or more graph communication links between graph component nodes of the data graph, wherein each labeled graph communication link includes one or more communication link security vulnerabilities between graph component nodes for the computing system under test;
utilizing the one or more automatically identified and labeled graph component nodes and the one or more automatically identified and labeled graph communication links to train a machine learning algorithm to predict one or more misconfigurations in the computing system under test based on the one or more component node security vulnerabilities included in each component node label for the one or more graph component nodes and the one or more communication link security vulnerabilities included in each communication link label for the one or more graph communication links; and
determining one or more modifications to the computing system under test for mitigating the one or more misconfigurations predicted by the machine learning algorithm.

9. The method of claim 8, further comprising:
converting diagram data of the computing system into the graph data,
wherein:
the computing system includes system nodes coupled to each other via a respective system communication link,
the graph component nodes represent each respective system node, and
the graph communication links represent each respective system communication link.

10. The method of claim 9, further comprising one of:
receiving the diagram data from a user in response to the user generating the diagram data; and
generating the diagram data in response to receiving data for the computing system from the user.

11. The method of claim 9, further comprising:
automatically identifying and labeling the one or more graph component nodes of the data graph of the computing system with a respective component node label,
automatically identifying and labeling the one or more graph communication links between graph component nodes of the data graph of the computing system with a respective communication link label; and
utilizing the one or more labeled graph nodes and the one or more labeled communication links to train a neural network to predict the one or more misconfigurations in the computing system based on the one or more component node security vulnerabilities included in the respective component node labels for the one or more labeled graph component nodes and based on the one or more communication link security vulnerabilities included in the respective communication link labels for the one or more labeled communication links.

12. The method of claim 8, further comprising:
automatically identifying and labeling each graph component node of the data graph of the computing system with a respective component node label,
automatically identifying and labeling each graph communication link between graph component nodes of the data graph of the computing system with a respective communication link label; and
utilizing each graph component node and each communication link of the data graph to train a neural network to predict the one or more misconfigurations in the computing system based on the one or more component node security vulnerabilities included in each respective component node label for the graph component nodes and based on the one or more communication link security vulnerabilities included in each respective communication link label for the communication links.

13. The method of claim 8, wherein:
the method further comprises providing the one or more modifications to the computing system to a user; and
the one or more modifications mitigate one of all of the misconfigurations and a subset of the misconfigurations.

14. The method of claim 8, wherein the machine learning algorithm comprises a Deep Graph Convolutional Neural Network.

15. A computer program product comprising a non-transitory computer-readable storage device including code embodied therewith, the code executable by a processor to cause the processor to:
automatically identify and label, with a respective component node label, one or more graph component nodes of a data graph representing a computing system under test, wherein each labeled graph component node includes one or more component node security vulnerabilities for the computing system under test;
automatically identify and label, with a respective communication link label, one or more graph communication links between graph component nodes of the data graph, wherein each labeled graph communication link includes one or more communication link security vulnerabilities between graph component nodes for the computing system under test;
utilize the one or more automatically identified and labeled graph component nodes and the one or more automatically identified and labeled graph communication links of the data graph to train a machine learning algorithm to predict one or more misconfigurations in the computing system under test based on the one or more component node security vulnerabilities included in each component node label for the one or more graph component nodes and the one or more communication link security vulnerabilities included in each communication link label for the one or more graph communication links; and
determine one or more modifications to the computing system under test for mitigating the one or more misconfigurations predicted by the machine learning algorithm.

16. The computer program product of claim 15, wherein the code further causes the processor to:
convert diagram data of the computing system into the graph data,
wherein:
the computing system including system nodes coupled to each other via a respective system communication link,
the graph component nodes represent each respective system node, and
the graph communication links represent each respective system communication link.

17. The computer program product of claim 16, wherein the code further causes the processor to one of:
receive the diagram data from a user in response to the user generating the diagram data; and
generate the diagram data in response to receiving data for the computing system from the user.

18. The computer program product of claim 15, wherein the code further causes the processor to:
automatically identify and label the one or more graph component nodes of the data graph of the computing system with a respective component node label;
automatically identify and label the one or more graph communication links between graph component nodes of the data graph of the computing system with a respective communication link label; and
utilize the one or more labeled graph nodes and the one or more labeled communication links to train a neural network to predict the one or more misconfigurations in the computing system based on the one or more component node security vulnerabilities included in the respective component node labels for the one or more labeled graph component nodes and based on the one or more communication link security vulnerabilities included in the respective communication link labels for the one or more labeled communication links.

19. The computer program product of claim 15, wherein:
the code further causes the processor to provide the one or more modifications to the computing system to a user; and
the one or more modifications mitigate one of all of the misconfigurations and a subset of the misconfigurations.

20. The computer program product of claim 15, wherein the machine learning algorithm comprises a Deep Graph Convolutional Neural Network.

* * * * *